United States Patent [19]

Maemine et al.

[11] Patent Number: 4,737,675

[45] Date of Patent: Apr. 12, 1988

[54] BRUSHLESS MOTOR WITH CENTER LEADS FOR PREVENTING SIGNAL DISTORTION

[75] Inventors: Kenji Maemine, Kakuda; Yuki Sato, Watari, both of Japan

[73] Assignee: Alps Electric Co., Ltd., Japan

[21] Appl. No.: 892,954

[22] Filed: Aug. 4, 1986

[30] Foreign Application Priority Data

Aug. 2, 1985 [JP] Japan .................. 60-119510[U]

[51] Int. Cl.⁴ .................. H02K 15/00; H02K 21/12; H02K 11/00
[52] U.S. Cl. .................. 310/268; 310/71; 439/78
[58] Field of Search .................. 29/596; 310/71, 171, 310/268, DIG. 6, 42, 156; 339/17 F

[56] References Cited

U.S. PATENT DOCUMENTS

| | | | |
|---|---|---|---|
| 2,706,697 | 4/1955 | Eisler | 310/DIG. 6 |
| 4,111,510 | 9/1978 | Zurcher | 339/17 F |
| 4,260,920 | 4/1981 | Nakamura et al. | 310/268 |
| 4,366,405 | 12/1982 | Schmider | 310/268 |
| 4,455,516 | 6/1984 | Furusho | 310/156 |
| 4,476,404 | 10/1984 | Bygdnes | 310/71 |
| 4,578,606 | 3/1986 | Welterlin | 310/268 |

Primary Examiner—Patrick R. Salce
Assistant Examiner—D. L. Rebsch
Attorney, Agent, or Firm—Guy W. Shoup

[57] ABSTRACT

In a brushless motor, a rotor magnet comprises a main magnetizing member with alternate N-poles and S-poles and a subsidiary magnetizing member for detecting rotational speed disposed at an inner side and having N-poles and S-poles arranged at a smaller pitch in comparison to the main magnetizing member. A stationary plate is provided with stator coils opposed to the main magnetizing member and a detecting substrate has a pattern in opposition to the subsidiary magnetizing member for detecting rotational speed. The detecting substrate is installed on the stator coils, and leads from the detecting substrate extend through the center of the stationary plate towards the rear side thereof, to avoid the signal distortion of prior art designs.

1 Claim, 3 Drawing Sheets

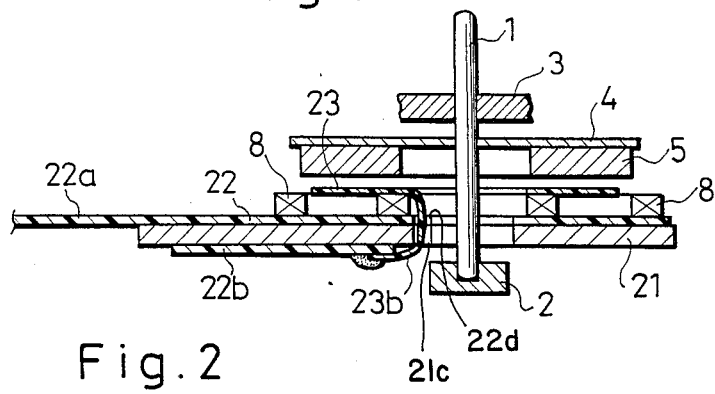
Fig. 1
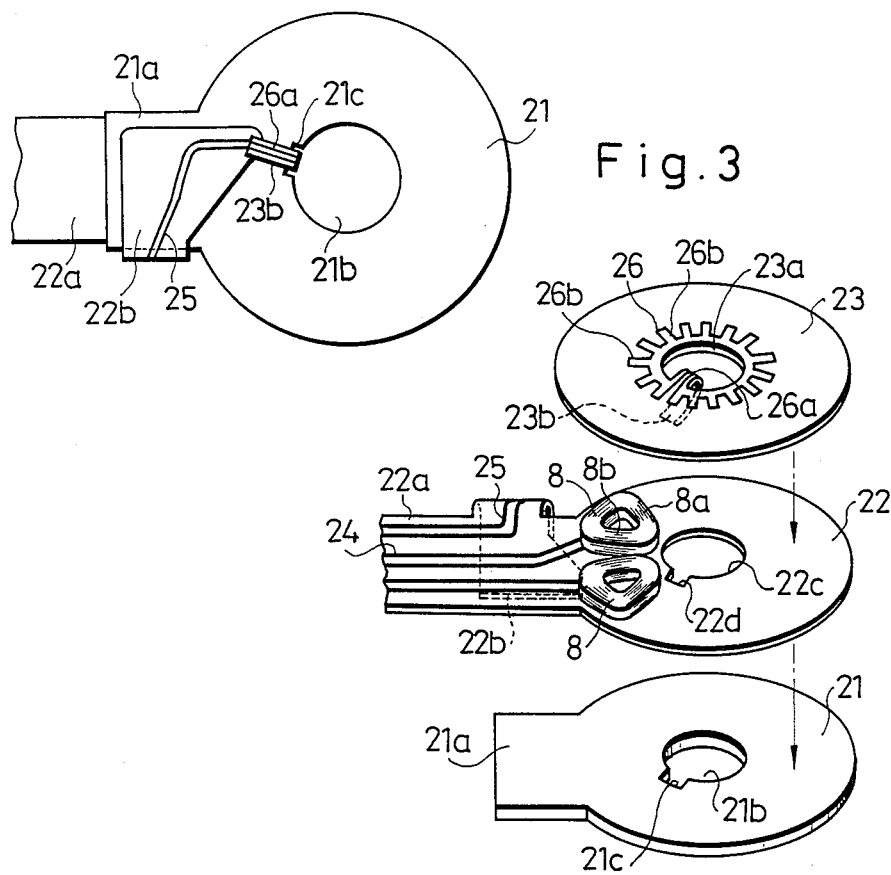
Fig. 2
Fig. 3

BRUSHLESS MOTOR WITH CENTER LEADS FOR PREVENTING SIGNAL DISTORTION

BACKGROUND OF THE INVENTION

1. Field of the Invention

The present invention relates to a brushless motor which is installed as a drive member of a compact disc player, a tape player or the like.

2. Description of the Prior Art

FIG. 4 is a sectional view of a brushless motor in the prior art.

The rotary shaft 1 is rotatably supported by a thrust bearing 2 and a radial bearing 3. A rotor yoke 4 is fixed to the rotary shaft 1, and a ring-shaped rotor magnet 5 is fixed to a lower surface of the rotor yoke 4. A coil substrate 7 is fixed on the stationary plate 6. The coil substrate 7 is flexible. A plurality of stator coils 8 are fixed on an upper surface of the coil substrate 7. The stator coils 8 are wound in nearly square form and arranged at regular intervals as shown in FIG. 5. A lead plate 7a extends integrally from the edge portion of the coil substrate 7. A lead pattern (not shown) is formed on the lead plate 7a, and current is supplied to each stator coil 8 through the lead pattern. A detecting substrate 9 is fixed on the stator coils 8. The detecting substrate 9 is also a flexible substrate. The detecting substrate 9 is provided with a pattern 10 for detecting the rotational speed as shown in FIG. 6. A lead plate 9a is installed integrally to the side edge portion of the detecting substrate 9, and lead patterns 10a are formed on the lead plate 9a. A signal from the pattern 10 for detecting the rotational speed is taken out by the lead patterns 10a.

As shown in FIG. 7, the rotor magnet 5 comprises a main magnetizing member 5a formed on an outer circumferential portion, and an FG magnetizing member 5b for detecting the rotational speed formed on an inner diameter side. In the main magnetizing member 5a, N-poles and S-poles are alternately arranged in the circumferential direction and magnetized. The stator coil 8 is constituted so that current flows in the radial direction at linear parts 8a and 8b. Electromotive force in the rotational direction acts on the rotor magnet 5 according to the current flowing through the linear parts 8a and 8b and the polarity of the main magnetizing member 5a opposed to the current.

In the FG magnetizing member 5b of the rotor magnet 5, N-poles and S-poles are alternately formed in the circumferential direction at shorter pitch than that of the main magnetizing member 5a. On the other hand, the detecting pattern 10 as shown in FIG. 6 comprises detecting parts 10b arranged at short pitch so that current flows in the radial direction. The pattern 10 for detecting the rotational speed is opposed to the FG magnetizing member 5b as shown in FIG. 8. If the rotor magnet 5 is rotated, pulses are outputted from the pattern 10 for detecting the rotational speed corresponding to the magnetic poles of the FG magnetizing member 5b. The rotational speed of the rotor magnet 5 is detected according to the pulse output.

In the brushless motor in the prior art, the detecting substrate 9 is formed as shown in FIG. 6, and the lead patterns 10a connected to the pattern 10 for detecting the rotational speed extend in parallel to each other at a small spacing. Furthermore, the lead patterns 10a cross the main magnetizing member 5a of the rotor magnet 5 and extend outward as shown in FIG. 8. Consequently, if the rotor magnet 5 is driven to rotate, the main magnetizing member 5a is moved across the lead patterns 10a so that electromotive force is produced in the lead patterns 10a by means of the magnetic force of the main magnetizing member 5a. When the two lead patterns 10a are disposed across magnetic poles of the same polarity, e.g., N-poles of the main magnetizing member 5a, the electromotive force in the same direction acts on the two lead patterns 10a (refer to α in FIG. 8). In this case, the electromotive force in the two lead patterns 10a is canceled, and current does not flow in the lead patterns 10a. On the contrary, as shown in FIG. 8, when the two lead patterns 10a ride on the border of the N-pole and the S-pole, the electromotive force in different directions is generated in the two lead patterns 10a as shown in β of FIG. 8. Since the lead patterns 10a are connected to both ends of the pattern 10 for detecting the rotational speed in series with each other, unwanted current flows through the pattern 10 for detecting the rotational speed and the lead patterns 10a by means of the electromotive force shown at β. If the unwanted current is produced, as shown in FIG. 9, regular distortion is produced in the rotational speed detecting pulses P outputted from the lead patterns 10a.

SUMMARY OF THE INVENTION

In view of above-mentioned disadvantages in the prior art, an object of the invention is to provide a brushless motor wherein leads extending from a rotational speed detecting pattern do not cross a magnetizing member for driving a rotor magnet, and pulse output for detecting the rotational speed does not include distortion, thereby the detecting accuracy is improved.

The invention consists in a brushless motor, wherein a rotor magnet is rotatably supported and comprises a main magnetizing member with N-poles and S-poles alternately arranged in the rotational direction, and a subsidiary magnetizing member for detecting the rotational speed disposed at an inner radial position with respect to the main magnetizing member and having N-poles and S-poles alternately arranged at smaller pitch than that in the main magnetizing member, and a stationary plate is provided with stator coils opposed to the main magnetizing member wherein current flows in the radial direction of the rotor magnet, and a detecting substrate having a pattern in opposition to the subsidiary magnetizing member for detecting the rotational speed, characterized in that the detecting substrate is installed on the stator coil, and leads from the detecting substrate extend through the center of the stationary plate towards the rear side thereof.

Since the leads of the detecting substrate extend towards the rear side of the stationary plate without crossing the main magnetizing member of the rotor magnet, electromotive force is not generated in the leads by the main magnetizing member when the rotor magnet is rotated.

BRIEF DESCRIPTION OF THE DRAWINGS

FIG. 1 is a sectional view of a brushless motor according to the invention;

FIG. 2 is a rear elevation of the brushless motor;

FIG. 3 is an exploded perspective view of the brushless motor;

DESCRIPTION OF THE PREFERRED EMBODIMENT

An embodiment of the invention will now be described, referring to FIGS. 1 through 3.

Figure 4:
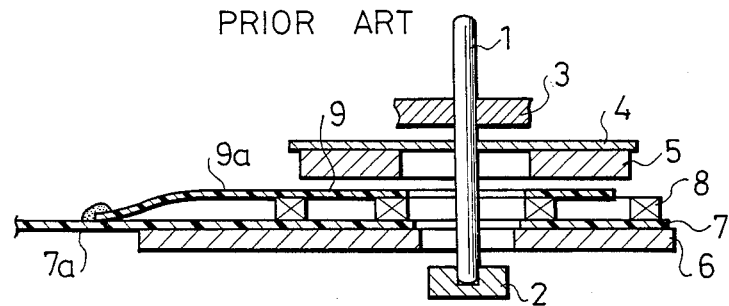
FIG. 4 is a sectional view of a brushless motor in the prior art.
Figure 5:
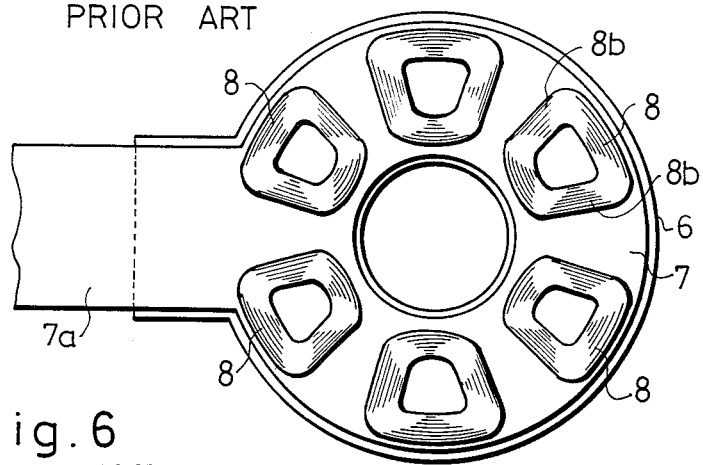
FIG. 5 is a plan view of the brushless motor illustrating a coil mounting part.
Figure 6:
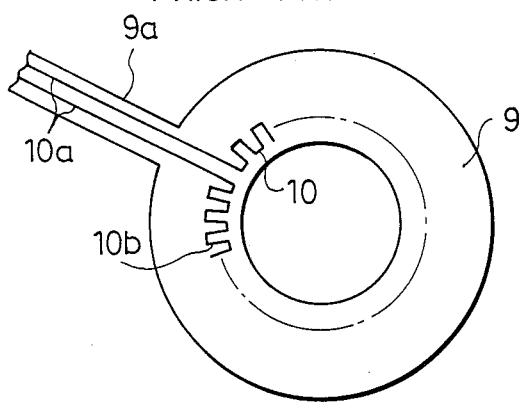
FIG. 6 is a plan view of a detecting substrate in the prior art.
Figure 7:
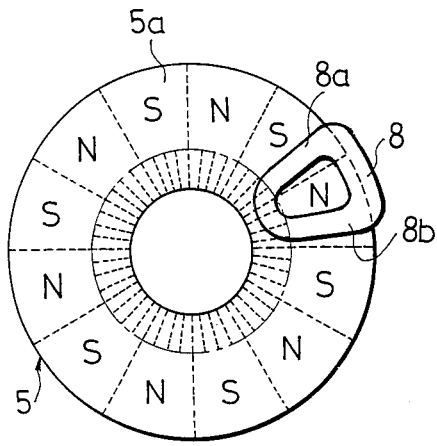
FIG. 7 is a plan view of a rotor magnet.

The brushless motor of the invention is similar to that of the prior art in basic structure. That is, a rotary shaft 1 is rotatably supported by a thrust bearing 2 and a radial bearing 3, and a rotor yoke 4 and a rotor magnet 5 are fixed to the rotary shaft 1. A coil substrate 22 is fixed on a stationary plate 21, and a plurality of stator coils 8 are fixed on an upper surface of the coil substrate 22. A detecting substrate 23 is installed on the stator coils 8. As shown in FIG. 7, the rotor magnet 5 comprises a main magnetizing member 5a at an outer circumferential portion and an FG magnetizing member 5b for detecting the rotational speed at an inner diameter side. In the main magnetizing member 5a, N-poles and S-poles are alternately arranged in the circumferential direction and magnetized. The stator coils 8 are opposed to the main magnetizing member 5a. In the FG magnetizing member 5b of the rotor magnet 5, N-poles and S-poles are alternately magnetized in the circumferential direction at shorter pitch than that of the main magnetizing member 5a.

The stationary plate 21 is made of a metal plate in a ring shape. A rectangular extension 21a is formed integrally with a lateral side of the stationary plate 21. A hole 21b is bored on the center of the stationary plate 21, and a notch 21c is provided at an edge portion of the hole 21b.

The coil substrate 22 is made of a flexible substrate. A lead plate 22a is formed integrally with a lateral side of the coil substrate 22, and a bent part 22b extends integrally from an edge portion of the lead plate 22a. The stator coils 8 are fixed on an upper surface of the coil substrate 22. As shown in FIG. 3, the stator coils 8 are wound in nearly square form, and the linear parts 8a and 8b extend in the radial direction. For convenience of drawing, FIG. 3 shows only two among the plurality of stator coils 8. A lead pattern 24 is formed on the coil substrate 22. One end of the lead pattern 24 is connected to a lead wire of each stator coil 8. The lead pattern 24 extends on the lead plate 22a and is connected to an external circuit by a connector provided on an end portion of the lead plate 22a. The coil substrate 22 is adhered and fixed on the upper side of the stationary plate 21, and the lead plate 22a is adhered on the upper side of the extension 21a. A bent part 22b extending at the lateral side of the lead plate 22a is bent towards a rear surface of the extension 21a and adhered to the rear surface (refer to FIG. 2). Two lead patterns 25 for taking the rotational speed detecting signals are formed on the bent part 22b of the coil substrate 22, and pass through the upper side of the lead plate 22a and are connected to the connector, together with the lead pattern 24. A hole 22c is formed on the center of the coil substrate 22, and a notch 22d is formed on the edge portion of the hole 22c. The notch 22d is formed at the same position as that of the notch 21c of the stationary plate 21.

The detecting substrate 23 is made of a flexible substrate. A hole 23a is bored on the center of the detecting substrate 23, and a lead plate 23b extends integrally from the edge portion of the hole 23b towards inside. A pattern 26 for detecting rotational speed is formed on an upper surface of the detecting substrate 23. In the rotational speed detecting pattern 26, parts 26b extending in the radial direction are spaced at regular intervals corresponding to the pitch of the magnetic poles of the FG magnetizing member 5b. Lead patterns 26a are connected to both ends of the pattern 26. The lead patterns 26a extend to the upper side of the lead plate 23b. The detecting substrate 23 is adhered on the stator coil 8. The lead patterns 26a extend through the notch 22d of the coil substrate 22 and the notch 21c of the stationary plate 21 to the rear surface of the stationary plate 21. As shown in FIG. 2, the top end portion of the lead plate 23b is connected to the bent part 22b of the coil substrate 22, and the lead pattern 26a on the lead plate 23b and the lead pattern 25 on the bent part 22b are rendered conductive by soldering. In this construction, output signals of the rotational speed detecting pattern 26 can be taken from the lead pattern 25 on the coil substrate 22.

Operation of the brushless motor will now be described.

Current flows through each coil 8 in clockwise and counterclockwise directions alternately. More specifically, a Hall element or the like detects the polarity of the main magnetizing member 5a of the rotor magnet 5 positioned thereon, and current flows through each coil 8 in clockwise and counterclockwise directions corresponding to the detection of the polarity. Electromagnetic force in the rotational direction is produced by current flowing through the linear parts 8a and 8b of the coil 8 and the magnetic field generated by the magnetizing member 5a of the rotor magnet 5, and the rotor magnet 5 and the yoke 4 and the rotary shaft 1 are driven to rotate.

Figure 10:
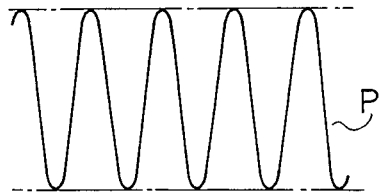
FIG. 10 is a diagram illustrating rotational speed detecting pulses of the brushless motor according to the invention.

In the rotational speed detecting pattern 26 on the detecting substrate 23, current flows corresponding to the polarity during passing of the FG magnetizing member 5b and the rotational speed detecting pulses P shown in FIG. 10 are generated. The output is transmitted from the lead pattern 26b to the lead pattern 25 on the coil substrate 22, and taken from the connector at the end portion of the lead plate 22a of the coil substrate 22 to the external circuit. The rotational speed of the motor is detected by counting the output pulses. In a compact disc player or the like, current flowing through the coil 8 is controlled corresponding to the detected rotational speed, whereby the rotational speed of the disc drive member is controlled.

Figure 8:
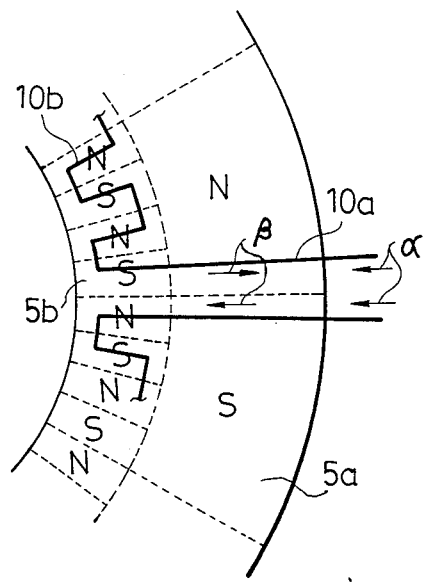
FIG. 8 is an enlarged plan view illustrating the rotor magnet and a rotational speed detecting pattern in the prior art.
Figure 9:
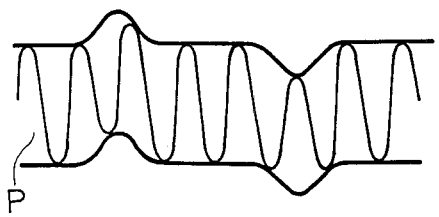
FIG. 9 is a diagram illustrating rotational speed detecting pulses of the brushless motor in the prior art.

Since the lead pattern 26b connected to the rotational speed detecting pattern 26 extends from the center of the stationary plate 21 towards the rear surface thereof by the lead plate 23b of the detecting substrate 23, the lead pattern 26a does not cross the driving magnetizing member 5a of the rotor magnet 5. Accordingly, distortion of output signal due to crossing of the magnetic pole border of the driving magnetizing member 5a with the lead pattern as seen in the prior art described in FIG. 8 can be eliminated in the invention. Thus the output pulses P from the rotational speed detecting pattern 26 becomes flat, as seen in FIG. 10.

According to the invention as above described, since leads of the rotational speed detecting pattern are not affected by the magnetic poles of the rotor magnet, the rotational speed detecting pulses can be taken out without including unwanted components. Thus the rotational speed can be controlled with high accuracy.

What is claimed is:

1. A brushless motor comprising:

a rotatably supported rotor having a rotor magnet provided with a main magnetic member located at a radially outward part of the rotor and composed of magnetic N-poles and S-poles alternately arranged at angular intervals in a circumferential direction, and a subsidiary magnetic member located at a radially inward part of the rotor and composed of magnetic N-poles and S-poles alternately arranged at a smaller angular pitch than those of the main magnetic member; and a stationary plate in parallel with said rotor having stator coils on one side facing said rotor located opposite said magnetic poles of said main magnetic member for driving the rotor in rotation when current is provided to said stator coils, and a detecting substrate provided with a conductive pattern thereon opposite said magnetic poles of said subsidiary magnetic member in which a current signal indicating rotational speed is generated upon rotation of the rotor;

wherein said detecting substrate is disposed concentrically in parallel on said stator coils on said one side of said stationary plate facing said rotor, and a pair of leads connected to the conductive pattern on the substrate extend through a center part of said stationary plate, which is radially inward of said main magnetic member, to an opposite side of said stationary plate from said rotor, such that the current signal is not distorted by the effect of the main magnetic member.

* * * * *